United States Patent [19]

Brown et al.

[11] 4,400,681

[45] Aug. 23, 1983

[54] SEMICONDUCTOR PRESSURE SENSOR WITH SLANTED RESISTORS

[75] Inventors: Ronald E. Brown; Lamonte R. Edison, both of Kokomo; William D. Higdon, Greentown, all of Ind.

[73] Assignee: General Motors Corporation, Detroit, Mich.

[21] Appl. No.: 237,474

[22] Filed: Feb. 23, 1981

[51] Int. Cl.³ .............................................. G01L 1/22
[52] U.S. Cl. ........................................... 338/4; 338/2
[58] Field of Search ...................................... 338/2–5;
73/727, 726, 721, 720, 777, DIG. 4; 357/26

[56] References Cited

U.S. PATENT DOCUMENTS 3,213,681 10/1965 Pearson .............................. 73/777 X
3,505,874 4/1970 Kato et al. ............................ 338/4 X
3,968,466 7/1976 Nakamura et al. ................... 338/4 X
4,065,970 1/1978 Wilner .................................. 338/4 X Primary Examiner—C. L. Albritton
Attorney, Agent, or Firm—Warren D. Hill

[57] ABSTRACT

A diaphragm is formed in a silicon chip by etching a rectangular cavity in one side thereof and piezoresistive resistors are formed in the other surface of the chip to sense stress changes on the diaphragm due to pressure changes. At least one resistor is placed along the edge of the diaphragm where a sharp stress peak occurs. To avoid the problem of inaccurate placement of the resistor relative to the peak, the resistor is slanted with respect to the stress ridge at a small angle of 10° to 20°. This makes the resistor placement and cavity alignment much less critical thereby assuring greater uniformity of response from one sensor to another at the expense of signal size for a given pressure change on the device.

7 Claims, 5 Drawing Figures

SEMICONDUCTOR PRESSURE SENSOR WITH SLANTED RESISTORS

This invention relates to semiconductor pressure sensors and more particularly to such sensors having a pressure responsive diaphragm with piezoresistive resistors thereon for sensing pressure induced strain in the diaphragm.

It is well known to fabricate a pressure sensor by etching a cavity in one side of a silicon chip to form a diaphragm and then form on the diaphragm surface several strain sensing resistors for connection into a strain measuring bridge. Ideally at least one resistor lies along a high strain peak or ridge which runs parallel to the edge of the diaphragm and very close to the edge. A resistor thus placed takes maximum advantage of the strain pattern on the diaphragm to obtain maximum signal change for a given pressure change. The peak of the strain pattern is so sharp, however, that alignment of the resistor placement with respect to the cavity edge is critical. That is, if the resistor is placed a relatively short distance from the strain peak, it can lie in a relatively low strain region. Thus, small variances from one pressure sensor to another result in unacceptably large variances in resistor response to pressure. Thus, low yields of pressure sensors is the consequence of poor uniformity of response. It is desired, however, to achieve a high yield of pressure sensors so that they can be manufactured economically in high volumes.

It is, therefore, an object of this invention to provide a semiconductor pressure sensor having a resistor configuration which takes advantage of the high strain ridge adjacent the diaphragm edge and yet does not have a critical placement.

It is another object of the invention to provide pressure sensor structure which is conducive to more uniform response and thus higher yields during production than is obtained with prior art devices.

This invention is carried out by providing a semiconductor chip containing a cavity defining a diaphragm such that a high strain ridge occurs along an edge of the diaphragm, a plurality of strain sensing resistors on the diaphragm, at least one of the resistors being elongated and slanted across the high stress ridge at a small angle to the ridge so that if there are small variations in resistor placement relative to the ridge, the resistor still will cross the peak and only minor variations in resistor response to diaphragm strain will result.

The above and other advantages will be made more apparent from the following specification taken in conjunction with the accompanying drawings wherein like reference numerals refer to like parts and wherein.

Figure 1:
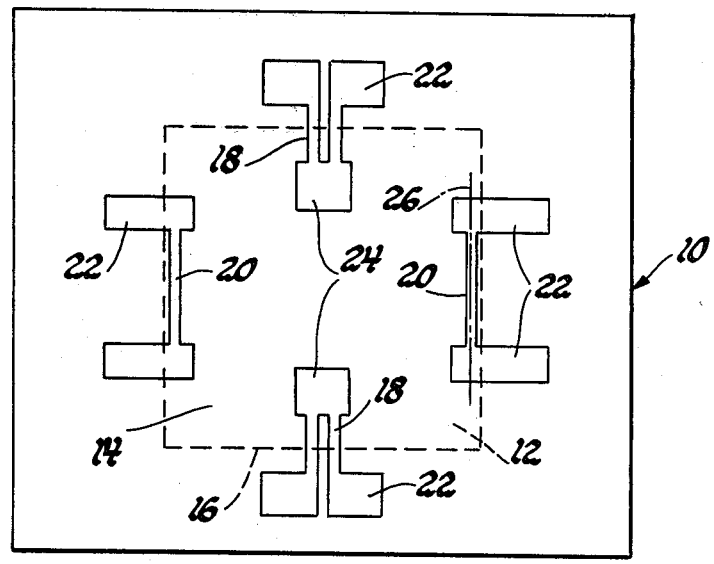
FIG. 1 is a top view of a pressure sensing semiconductor chip with resistor placement according to the prior art.
Figure 2:
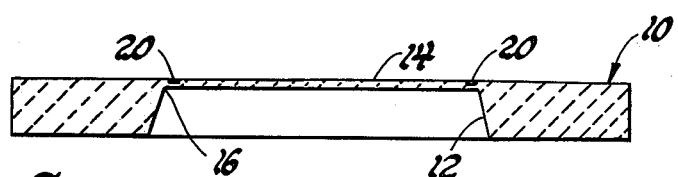
FIG. 2 is a cross sectional view of the pressure sensor of FIG. 1.

FIGS. 1 and 2 illustrate a semiconductor pressure sensor according to the prior art which comprises a silicon chip 10 having a cavity 12 etched therein on one side to form a diaphragm 14 of about 1 mil thickness so that it readily responds to changes in differential pressure applied across the diaphragm. The edge 16 of the diaphragm is generally rectangular in shape and encompasses an area of typically 30 or 40 mils on each side. According to the usual practice, a pair of resistors 18 extend in a direction generally toward the center of the diaphragm to measure the diaphragm strain by current flow in the radial direction and a second pair of resistors 20 extend parallel to the diaphragm edge to measure the strain by current flow in the so-called tangential direction. The resistors comprise thin elongated strips about 1 mil wide and sufficient length, say 10 to 15 mils, to provide a desired resistance and are connected to contact areas 22 at either end which have at least a portion lying beyond the diaphragm edge 16. The resistors 18 are each formed in two parallel segments connected by contact areas 24 on the diaphragm. The resistors and contact areas together comprise island-like regions of one conductivity type in a silicon surface of the opposite conductivity type formed by ion implantation or diffusion.

Figure 3:
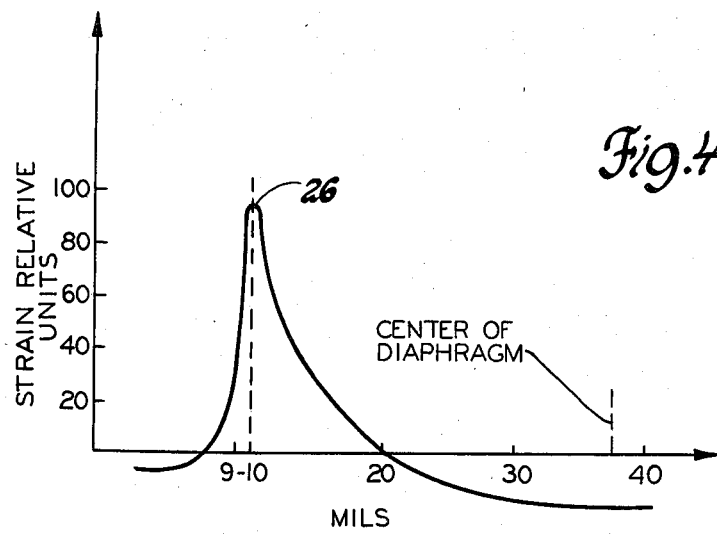
FIG. 3 is a curve illustrating the pattern of pressure induced strain along the surface of the semiconductor pressure sensor.

FIG. 3 diagrammatically illustrates the strain measured at various points along the sensor chip beginning at a point outside the diaphragm about 9 mils from the edge and then proceeding toward the diaphragm center. That is, the diaphragm edge 16 occurs at 9 mils on the diagram. Thus, it is seen that a sharp strain peak occurs just inside the diaphragm edge about 1 mil from the edge. The peak 26 actually forms a ridge since it extends along the diaphragm edge and parallel thereto as shown by a broken line 26 in FIG. 1. Ideally the resistor 20 extends along the high strain ridge 26 in order to obtain a maximum signal response for any change in pressure. The accuracy of placement of the resistor 20 right on the ridge 26 depends not only on the accuracy of registration of various masks used in resistor formation and in the cavity etching step but also in the control of the etching. The actual size of the cavity 12 and thus the position of the edges 16 can vary somewhat according to how well the etching is controlled. Thus, the distance of the resistor 20 from the edge 16 may vary. As can be seen from the curve of FIG. 3, if the resistor placement misses the strain ridge 26 by a small amount, say 1 mil, then the resistor sensitivity to diaphragm pressure will be dramatically reduced and may very well be unacceptable, particularly where it is desired to fabricate a large number of sensors having somewhat uniform response characteristics.

Figure 4:
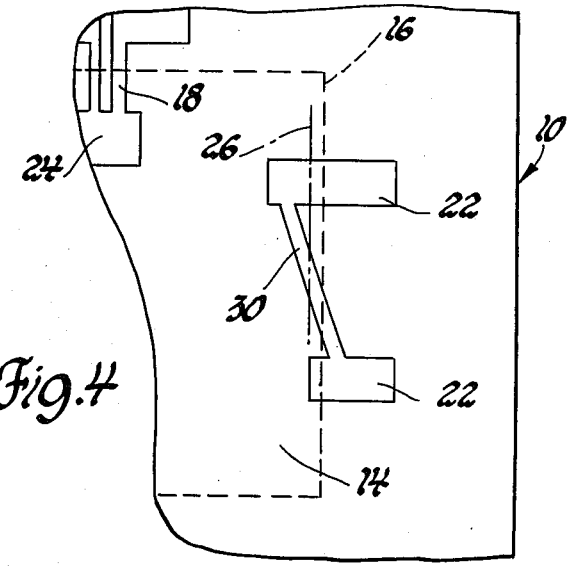
FIG. 4 is a plan view of a portion of a pressure sensor with resistor configuration according to the invention.
Figure 5:
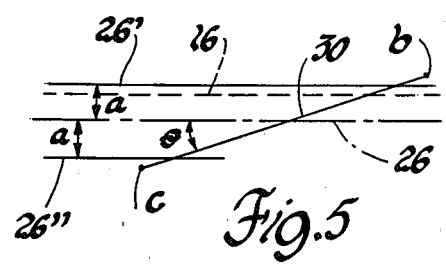
FIG. 5 is a diagram illustrating the geometrical relationships of the semiconductor pressure sensor according to the invention.

As illustrated in FIG. 4, the criticality of resistor placement is very much lessened by slanting the resistor 30 at a small angle with respect to the diaphragm edge 16 and therefore to the strain ridge 26. This allows for some variation in resistor placement with respect to the edge 16 by keeping at least a portion of the resistor 30 in the high strain zone. Since some of the resistor will be in relatively low strain regions of the curve of FIG. 3, the overall signal change for a given pressure change will be less than the ideal case of FIG. 1. However, the uniformity of signal change from one sensor to another will be much greater so that the overall yield of the sensor fabrication process will be greater. The angle between the resistor 30 and the strain ridge 26 should be as small as is practical in order to maximize the signal change and the particular angle depends upon the accuracy with which the etching and other geometry controlling steps can be controlled. The geometrical relationships are exemplified in FIG. 5 where the nominal cavity edge 16 determines the position of the nominal strain ridge 26 relative to the fixed resistor 30 which is centered on the nominal ridge 26 and is positioned at an angle $\theta$ thereto. Due to manufacturing tolerances, the actual cavity edge and strain ridge position will vary from the nominal position by a distance of plus or minus "a". The lines 26' and 26" spaced a distance "a" on either side of the nominal strain ridge 26 indicate the acceptable limits of ridge position from sensor to sensor to define a tolerance band. The ends "b" and "c" of the slanted resistor 30 are positioned just outside the strain ridge limits 26' and 26" so that wherever the strain ridge occurs within those limits, the resistor 30 will traverse the tolerance band including the strain ridge 26. The actual size of the angle $\theta$ depends upon the length of the resistor 30 and the production tolerance "a" which determines the position of the resistor 30 relative to the strain ridge 26. Thus, for a given tolerance "a", the angle $\theta$ will be smaller for longer resistors 30 and it will be larger for shorter resistors 30. By keeping the tolerance "a" as small as possible, the angle $\theta$ is also kept small to optimize the resistor response to strain. Where the tolerance "a" is 1.5 mils and the resistor 30 length is 10.4 mils or 14.5 mils, for example, the angle $\theta$ is about 17° or 12° respectively. Depending on the tolerance afforded by the fabrication process and the design length of the resistor, the angle $\theta$ may, as a practical matter fall within the range of 10° to 20°. Even a small angle $\theta$ may effect a significant increase in yield, say a 10% improvement. Since the actual strain ridge 26 varies in its position relative to the resistor 30 and the strain curve is unsymmetrical, the resistor response to strain will also vary but by an amount which is small compared to the corresponding variations occurring in the prior art configuration of FIG. 1. That is, the slanted resistor, since it always covers the strain peak 26 as well as lower strain values, provides a relatively uniform response to strain within acceptable manufacturing tolerances even though the signal size is less than that of the resistor 20 of the FIG. 1 configuration.

It will thus be seen that according to the present invention a semiconductor pressure sensor is provided which has a greater ease of manufacturing to produce sensors sufficiently uniform in response to pressure to provide a high yield of sensors during manufacture thereof.

The embodiments of the invention in which an exclusive property or privilege is claimed are defined as follows:

1. A pressure sensing element comprising
   a semiconductor chip containing a cavity defining a diaphragm subject to deflection in response to pressure, the diaphragm having an elongated high strain zone adjacent and parallel to the diaphragm edge wherein upon diaphragm deflection a localized high strain peak is produced in the high strain zone, and
   a plurality of piezoresistive resistors in the chip for sensing strain in the diaphragm, at least one of said resistors for measuring the strain in the strain zone, said one resistor being elongated and slanted across the high strain zone with the longitudinal resistor axis disposed at an angle in the approximate range of 10° to 20° with respect to the said zone, so that small variations in resistor placement relative to the strain zone result in only minor variations in resistor response to diaphragm strain.

2. A pressure sensing element comprising
   a semiconductor chip containing a cavity defining a diaphragm subject to deflection in response to pressure, the diaphragm, upon deflection, having an elongated high strain ridge adjacent and parallel to the diaphragm edge, said
   a plurality of piezoresistive resistors in the chip for sensing strain in the diaphragm, at least one of said resistors for measuring the strain in the strain ridge, said one resistor being elongated and slanted across the high strain ridge with the longitudinal resistor axis disposed at an angle in the approximate range of 10° to 20° with respect to the said ridge, so that small variations in resistor placement relative to the strain ridge result in only minor variations in resistor response to diaphragm strain.

3. A pressure sensing element comprising
   a semiconductor chip containing a cavity defining a diaphragm subject to deflection in response to pressure, the diaphragm, upon deflection, having an elongated high strain ridge adjacent and parallel to the diaphragm edge wherein due to manufacturing tolerances the strain ridge occurs anywhere within a predetermined tolerance band defined by limits parallel to the diaphragm edge, and
   a plurality of piezoresistive resistors in the chip for sensing strain in the diaphragm, at least one of said resistors for measuring the strain in the strain ridge, said one resistor being elongated and slanted across the high strain ridge and traversing the tolerance band with both ends of the resistor disposed just outside the limits so that small variations in resistor placement relative to the strain ridge result in only minor variations in resistor response to diaphragm strain.

4. A pressure sensing element comprising
   a semiconductor chip containing a cavity defining a diaphragm subject to deflection in response to pressure, the diaphragm, upon deflection, having an elongated high strain ridge adjacent and parallel to the diaphragm edge, and
   a plurality of piezoresistive resistors in the chip for sensing strain in the diaphragm, at least one of said resistors for measuring the strain in the strain ridge, said one resistor being elongated and slanted across the high strain ridge with the longitudinal resistor axis disposed at an angle to the strain ridge large enough to significantly increase yields during manufacture thereof compared to resistors parallel to the strain ridge and small enough to have good resistor response to diaphragm strain, so that small variations in resistor placement relative to the strain ridge result in only minor variations in resistor response to diaphragm strain.

5. A pressure sensing element comprising:
   a semiconductor chip containing a cavity defining a diaphragm subject to deflection in response to pressure, the diaphragm, upon deflection, having an elongated high strain ridge adjacent and parallel to the diaphragm edge wherein due to manufacturing tolerances the strain ridge occurs anywhere within a predetermined tolerance band defined by limits parallel to the diaphragm edge, and
   an elongated piezoresistive resistor in said chip effective to measure strain in the strain ridge, the resistor lying across the tolerance band with the resistor ends outboard of the tolerance band and adjacent the limits thereof, and a direction of elongation slanted in relation to the tolerance band and as nearly parallel to the diaphragm edge as the tolerance band permits, whereby small variations in resistor placement relative to the strain ridge result in only minor variations in resistor response to diaphragm strains.

6. A pressure sensing element comprising:

a semiconductor chip containing a cavity defining a diaphragm subject to deflection in response to pressure, the diaphragm, upon deflection, having an elongated high strain ridge adjacent and parallel to the diaphragm edge wherein due to manufacturing tolerances the strain ridge occurs anywhere within a predetermined tolerance band defined by limits parallel to the diaphragm edge, the chip comprising a semiconductor material of one conductivity type, and two pairs of elongated piezoresistive resistors in said chip effective to measure strain in the diaphragm, each resistor including an elongated area of a conductivity type opposite to the conductivity type of the diaphragm, one pair of resistors having a direction of elongation generally perpendicular to the tolerance band, the other pair of resistors each lying across the tolerance band and having its direction of elongation slanted in relation to the tolerance band with its ends just outboard of the tolerance band so that small variations in resistor placement relative to the strain ridge result in only minor variations in resistor response to diaphragm strain.

7. A pressure sensing element comprising:

a semiconductor chip having a cavity in one face thereof having straight edges which defines a substantially rectangular diaphragm subject to deflection in response to pressure, the diaphragm, upon deflection, having elongated strain ridges adjacent and parallel to the straight edges of the diaphragm, a first pair of elongated piezoresistive resistors in an opposite face of said chip, each extending across respective first opposed edges of said diaphragm and located substantially perpendicular to said first edges, and a second pair of elongated piezoresistive resistors in an opposite face of said chip, each of said second resistors being slanted across a high strain ridge located adjacent respective second opposed edges of said diaphragm, the longitudinal resistor axis of said second resistors disposed at an angle to a respective strain ridge that is large enough to increase yields during manufacture thereof compared to resistors parallel to the strain ridge and small enough to have good resistor response to diaphragm strain, so that small variations in resistor placement relative to location of the cavity edges result in only minor variations in resistor response to diaphragm strain.

* * * * *